(12) United States Patent
Chung et al.

(10) Patent No.: US 6,799,294 B1
(45) Date of Patent: Sep. 28, 2004

(54) METHOD AND APPARATUS FOR GENERATING CHANNEL ERROR FLAGS FOR ERROR MITIGATION AND/OR CONCEALMENT IN SOURCE DECODERS

(75) Inventors: Sae-Young Chung, Waltham, MA (US); Hui-Ling Lou, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 454 days.

(21) Appl. No.: 09/716,558

(22) Filed: Nov. 20, 2000

Related U.S. Application Data

(60) Provisional application No. 60/195,495, filed on Apr. 6, 2000.

(51) Int. Cl.$^7$ .............................................. H03M 13/03
(52) U.S. Cl. ..................................... 714/786; 714/752
(58) Field of Search ............................... 714/780, 778, 714/755, 747, 786, 752, 746, 795, 760, 784; 386/21, 11; 375/287; 370/479, 342

(56) References Cited

U.S. PATENT DOCUMENTS

| | | | | |
|---|---|---|---|---|
| 4,675,870 A | * | 6/1987 | Baggen ....................... | 714/780 |
| 5,381,422 A | * | 1/1995 | Shimizu ...................... | 714/755 |
| 5,390,195 A | * | 2/1995 | Brush .......................... | 714/778 |
| 5,740,187 A | * | 4/1998 | Tanaka ........................ | 714/755 |
| 5,757,824 A | * | 5/1998 | Arai et al. ................... | 714/375 |
| 5,812,603 A | * | 9/1998 | Luthi et al. ................. | 375/287 |
| 6,430,724 B1 | * | 8/2002 | Laneman et al. ........... | 714/780 |

FOREIGN PATENT DOCUMENTS

| | | |
|---|---|---|
| JP | 08032458 A | 2/1996 |
| JP | 2001217727 A | 8/2001 |

OTHER PUBLICATIONS

J. Hagenauer, "Source–Controlled Channel Decoding," IEEE Transactions on Communications, vol. 43, No. 9, pp. 2449–2457, Sep. 1995.

L.R. Bahl et al., "Optimal Decoding of Linear Codes for Minimizing Symbol Error Rate," IEEE Transactions on Information Theory, vol. IT–20, pp. 284–287, Mar. 1974.

(List continued on next page.)

*Primary Examiner*—Christine T. Tu
*Assistant Examiner*—Mujtaba Chaudry

(57) ABSTRACT

Error flags are generated for use in source decoding of a source-coded bit stream transmitted through a channel of a communication system. The source-coded bit stream is channel coded using at least one channel code, and the channel code is decoded in a soft-decision channel decoder to generate a received version of the source-coded bit stream and one or more reliability measures associated with a designated portion of the received version of the source-coded bit stream. The reliability measures are processed to generate one or more error flags indicative of the presence of an error in the corresponding portion of the received version of the source-coded bit stream. The invention allows different detection capabilities to be used for different portions of the received version of the source-coded bit stream, and further allows these detection capabilities to be changed dynamically at the receiver. The error flags may be used to trigger an error mitigation/concealment algorithm in the source decoder. Advantageously, the error flags can be matched to frames or subframes of the source-coded bit stream, such that the performance of the error mitigation/concealment algorithm is substantially improved relative to its performance when using error flags generated from a conventional outer block code.

19 Claims, 4 Drawing Sheets

OTHER PUBLICATIONS

J. Rissanen et al., "Universal Modeling and Coding," IEEE Transactions on Information Theory, vol. IT–27, No. 1, pp. 12–23, Jan. 1981.

B.D. Pettijohn et al., "Joint Source/Channel Coding Using Arithmetic Codes," IEEE Data Compression Conference, 6 pages, Sep. 2000.

L. Guivarch et al., "Joint Source–Channel Soft Decoding of Huffman Codes with Turbo–Codes," IEEE Data Compression Conference, pp. 83–92, Sep. 2000.

Wen Xu, "Joint Source–Channel Coding with a Redundancy–Matched Binary Mapping in GSM Speech Transmission," IEEE Proceedings, 5 pages, Sep. 1998.

D. Sinha et al., "The Perceptual Audio Coder (PAC)," in Digital Audio, Section 42, pp. 42–1 to 42–18, CRC Press, 1998.

* cited by examiner

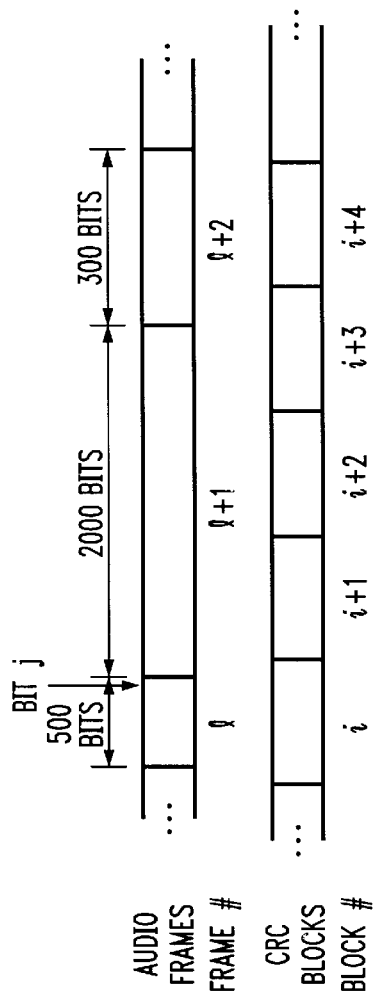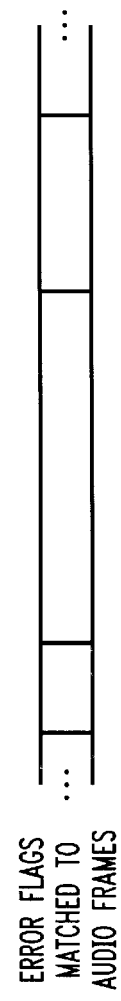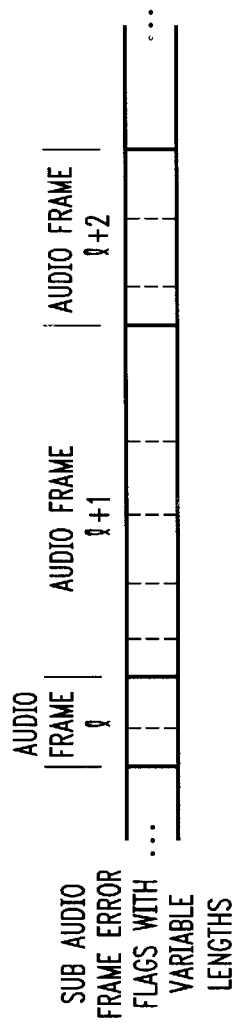
FIG. 3(a)
FIG. 3(b)
FIG. 3(c)

METHOD AND APPARATUS FOR GENERATING CHANNEL ERROR FLAGS FOR ERROR MITIGATION AND/OR CONCEALMENT IN SOURCE DECODERS

PRIORITY CLAIM

The present application claims the benefit of U.S. Provisional Application No. 60/195,495, filed Apr. 6, 2000 and entitled "Method of Producing Channel Error Flags for Error Mitigation and Concealment in Source Decoders."

FIELD OF THE INVENTION

The present invention relates generally to digital audio broadcasting (DAB) systems and other types of digital communication systems, and more particularly to techniques for generating error flags in such systems.

BACKGROUND OF THE INVENTION

It is well known that reliable channel error flags can be derived from block codes such as Reed Solomon (RS) codes. These error flags can be used to indicate whether a channel-decoded block of data is in error, so that appropriate error mitigation/concealment algorithms can be used in the source decoder. For example, RS codes have been proposed for use in bandwidth-limited systems such as in-band on-channel (IBOC) digital audio broadcasting (DAB) systems being developed for the AM radio band. Although more advanced channel coding techniques such as concatenated "Turbo" codes and trellis coded modulation (TCM) may provide better performance in such systems, the reliability of the channel error flags that can be generated using these conventional techniques is limited.

FIG. 1 shows a conventional DAB system 100 in which the above-noted block code approach is used to generate channel error flags. A transmitter portion of the system 100 includes a source encoder 102, a block coder 104 and a channel coder 106. A source signal is applied to an input of the source encoder 102 and is processed in the encoder to generate an output source-coded bit stream. The bit stream is applied to the block coder 104, which codes the bit stream using an RS code or other suitable block code. The resulting block-coded bit stream is then channel coded in the channel coder 106, which may be a convolutional coder. The block coder 104 and the channel coder 106 are also commonly referred to as an outer channel coder and an inner channel coder, respectively. The output of the inner channel coder 106 may be further processed prior to being applied to a communication channel 110 for delivery to a receiver portion of the system 100. Such further processing may include operations such as interleaving, modulation, upconversion, etc. which are omitted from the figure for clarity of illustration. The receiver portion of the system 100 includes an inner channel decoder 112, a block decoder 114 and a source decoder 116. Additional receiver operations, such as downconversion, demodulation, deinterleaving, etc. may be included but are again omitted for clarity of illustration. The received channel-coded bit stream is decoded in the inner channel decoder 112, which may be a Viterbi decoder, and the resulting block-coded bit stream is decoded in block decoder 114. The block decoder 114 generates a source-coded bit stream which is applied to an input of the source decoder 116. The block decoder 114 also generates a channel error flag which is supplied to the source decoder and used to trigger an algorithm for error mitigation or concealment. For example, if the error flag indicates that a particular block of bits contains an error, an error mitigation or concealment algorithm in the source decoder 116 may generate an interpolated output value using other blocks received without error, i.e., previous and subsequent blocks of bits.

As noted previously, an advantage of the block coding approach of FIG. 1 is that the channel error flags generated by block decoder 114 are very reliable. However, it would be preferable in bandwidth-limited systems and other applications to be able to provide reliable channel error flags without the need for block-based outer channel coding, i.e., to generate reliable channel error flags using only the inner channel code. For example, the block length associated with the outer channel block codes is fixed, while the source coder output frames are typically of variable length, leading to a mismatch between the block code generated error flags and the source coder output frames. Such a mismatch can prevent optimal performance of the error mitigation and concealment algorithms in the source decoder.

A need therefore exists for improved techniques for generating channel error flags from an inner channel coder, such that reliable channel error flags can be generated from channel codes such as concatenated codes and TCM, and the mismatch problem associated with the conventional block-based coding of FIG. 1 can be avoided.

SUMMARY OF THE INVENTION

The present invention provides methods and apparatus for generating channel error flags for use in error mitigation and/or concealment in source decoders. In accordance with one aspect of the invention, error flags are generated for use in source decoding of a source-coded bit stream transmitted through a channel of a communication system. The source-coded bit stream is channel coded using at least one channel code, and the channel code is decoded in a soft-decision channel decoder to generate a received version of the source-coded bit stream and one or more reliability measures associated with a designated portion of the received version of the source-coded bit stream. The reliability measures are processed to generate one or more error flags indicative of the presence of an error in the corresponding portion of the received version of the source-coded bit stream. The error flags may be used to trigger an error mitigation/concealment algorithm in the source decoder. Advantageously, the error flags can be matched to frames or subframes of the source-coded bit stream, such that the performance of the error mitigation/concealment algorithm is substantially improved relative to its performance when using error flags generated from a conventional outer block code.

In an illustrative embodiment of the invention, the reliability measures generated by the soft-decision channel decoder may include, for example, a posteriori probabilities for each bit or symbol in a designated portion of the received version of the source-coded bit stream. Such probabilities can be generated using a forward-backward decoding algorithm. As another example, the reliability measures generated by the soft-decision channel decoder in the illustrative embodiment may be log-likelihood ratios for each of the bits or symbols in the portion of the received version of the source-coded bit stream.

In accordance with another aspect of the invention, one of a number of different threshold-based processing techniques may be used to generate the error flags. For example, the reliability measures for each decoded bit or symbol in the designated portion of the received source-coded bit stream may be checked against a threshold, and if any one of the bits or symbols have reliability measures below the threshold, an error flag is generated for the portion. As another example, the reliability measures for one or more designated least reliable bits or symbols in the portion may be compared to the reliability measures for one or more designated most reliable bit or symbols in the portion, and an error flag generated for the portion based on the comparison. Different thresholds may be used for different portions of the received version of the source coded bit stream, or for different sub-portions of a given portion. The thresholds may be dynamically adapted in the source decoder to particular parameters or other characteristics of the source-coded bit stream.

The invention is particularly well-suited for use in conjunction with convolutional codes, Turbo codes and other concatenated codes, and trellis coded modulation (TCM), but could also be used with other types of channel codes.

The invention can be applied to any type of digital information, including, for example, audio, speech, video and image information, as well as various combinations thereof. In addition, the invention may be implemented in numerous digital communication applications, including AM and FM IBOC DAB systems, Internet and satellite broadcasting systems, etc.

BRIEF DESCRIPTION OF THE DRAWINGS

FIG. 3(a) illustrates mismatch between variable-length audio frames and fixed-length outer code blocks in the conventional system of FIG. 1.

FIGS. 3(b) and 3(c) illustrate the manner in which channel error flags can be matched to variable-length audio frames and sub frames, respectively, in the system of FIG. 2 using the flag generation techniques of the present invention.

DETAILED DESCRIPTION OF THE INVENTION

Figure 1:
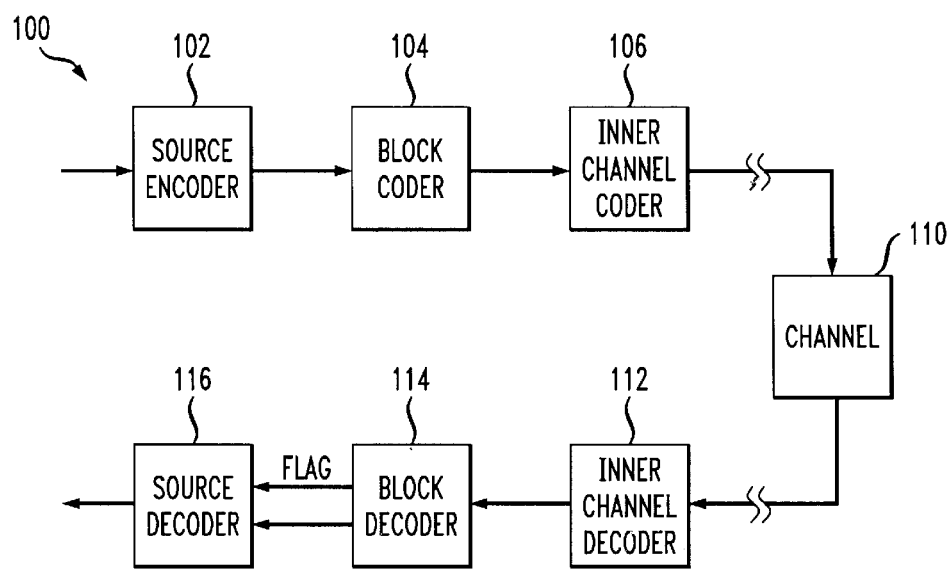
FIG. 1 is a block diagram of a conventional communication system which uses a block code for generating channel error flags.
Figure 2:
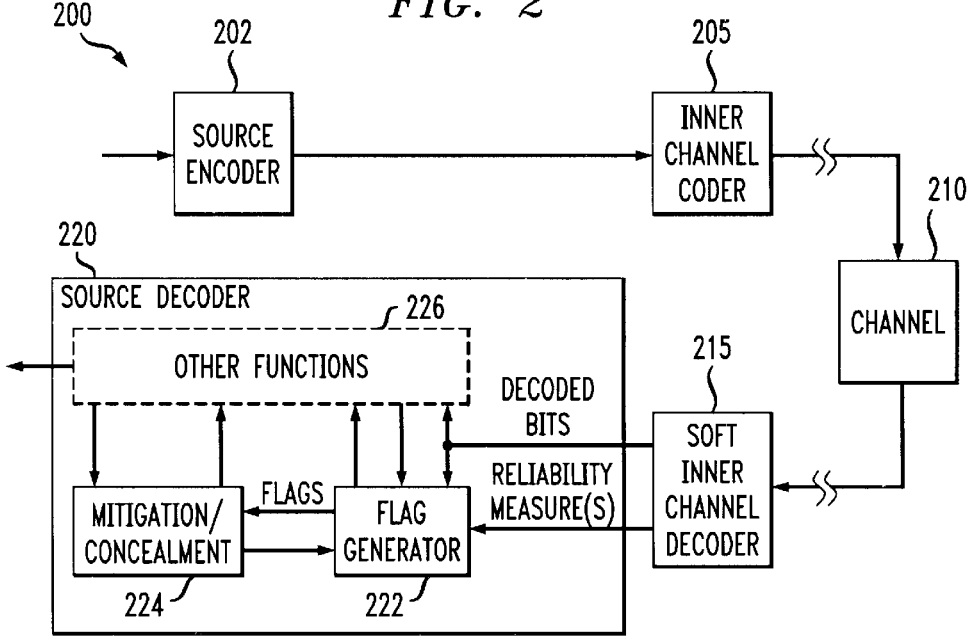
FIG. 2 is a block diagram of a communication system in accordance with an illustrative embodiment of the invention.

FIG. 2 shows a communication system 200 configured in accordance with an illustrative embodiment of the invention to generate reliable channel error flags from an inner channel code. A transmitter portion of the system 200 includes a source encoder 202 and an inner channel coder 205. An output channel-coded bit stream from the inner channel coder 205 is delivered over a communication channel 210 to a receiver portion of the system 200. The receiver portion of the system 200 includes a soft-decision inner channel decoder 215 and a source decoder 220. It should be noted that the system diagram in FIG. 1 is simplified for clarity of illustration, and that the transmitter and receiver portions of the system 200 may include additional elements commonly used in such systems, including interleavers and deinterleavers, modulators and demodulators, upconverters and downconverters, etc.

The illustrative embodiment of FIG. 2 does not include an outer channel coder and decoder, such as the block coder and decoder elements 104 and 114 of FIG. 1. The flag generation techniques of the present invention allow reliable channel error flags to be generated using only an inner channel code, such that the outer channel code can be eliminated. It should be understood, however, that the invention does not require that the outer channel code be eliminated. Other embodiments of the invention may utilize both an inner channel code and an outer channel code, and may generate and utilize channel error flags from both codes. For clarity, the channel code used in the illustrative embodiment of FIG. 2 is referred to as an inner channel code even though this particular embodiment of the invention does not include an outer channel code.

In operation, a source signal such as an audio, video, image or data signal is applied to the source encoder 202 and coded therein to generate an output source-coded bit stream. This bit stream is then channel coded in the inner channel coder 205, and the resulting channel-coded bit stream may be further processed before being delivered via the channel 210 to the receiver portion of the system 200. The receiver portion decodes the received channel-coded bit stream in the soft-decision channel decoder 215 to generate a stream of channel-decoded bits that are supplied to the source decoder 220. The soft-decision inner channel decoder 215 also generates one or more reliability measures that are supplied to the source decoder 220. A flag generator 222 receives the channel-decoded bits and the reliability measure(s) from the channel decoder 215 and generates channel error flags that are supplied to an error mitigation/concealment element 224 of the source decoder 220. The term "mitigation/concealment" as used herein is intended to encompass either mitigation or concealment or both. Numerous algorithms for performing error mitigation/concealment are known in the art, and such algorithms are therefore not described in detail herein.

The channel-decoded bits are also supplied to other functions 226 of the source decoder. Examples of such other functions include conventional source decoding elements. The flag generator 222 and error mitigation/concealment element 224 may interact with one or more of these other functions, as will be described in greater detail below.

The soft-decision inner channel decoder 215 may be any type of conventional soft-decision decoder which generates one or more reliability measures for decoded bits or symbols. An example of one such decoder uses the forward-backward decoding algorithm described in L. R. Bahl et al., "Optimal Decoding of Linear Codes for Minimizing Symbol Error Rate," IEEE Transactions on Information Theory, Vol. IT-20, pp. 284–287, March 1974, which is incorporated by reference herein, to compute reliability measures in the form of an a posteriori probability of each decoded bit or symbol. Another example is the decoder described in J. Hagenauer, "Source-Controlled Channel Decoding," IEEE Transactions on Communications, Vol. 43, No. 9, September 1995, which is incorporated by reference herein. This decoder generates reliability measures in the form of log-likelihood ratios for decoded bits or symbols. Other types of known soft-decision channel decoders may be used, such as a soft-decision Viterbi decoder.

The flag generator 222 utilizes the reliability measures generated by the soft-decision inner channel decoder 215 to generate error flags for groups of decoded bits or symbols in a given error flag frame. In one possible implementation, the flag generator 222 checks the reliability measure for each decoded bit or symbol in the group against a predetermined threshold, and if all the bits or symbols have reliability measures greater than or equal to the threshold, the group of bits or symbols is said to be error free and no error flag is generated. If any one bit or symbol in the group has a reliability measure that is smaller than the threshold, an error flag is generated for this group.

The threshold in the above-described implementation of the flag generator 222 may be determined for a given embodiment based on a trade off between the number of undetected errors and the number of "false alarms." More particularly, if the threshold is set too high, an error flag may be raised even though all the bits or symbols in the group are decoded correctly. This is referred to as a false alarm. On the other hand, if the threshold value is set too low, a frame may be considered error free even though the decoded group of bits or symbols contains bit errors. This is referred to as an undetected error.

A more particular example of an appropriate threshold for an AM IBOC DAB system having the general configuration shown in FIG. 2 is as follows. In this system, the soft-decision inner channel decoder 215 is assumed to utilize the forward-backward decoding algorithm described in the above-cited L. R. Bahl et al. reference. Error flags are generated based on the a posteriori probabilities calculated from the output of the forward-backward decoding algorithm. More particularly, an error flag is generated if the a posteriori probability of the least reliable decoded symbol in a given group of symbols is less than a threshold of 0.65. This threshold was determined empirically to provide an acceptable trade off between undetected errors and false alarms for the AM-IBOC DAB system. Appropriate thresholds could be determined in a similar manner for other types of systems.

A significant advantage of the flag generation process described above is that the channel error flags can be generated based on an arbitrary group of bits or symbols, and thus do not have to be matched to the channel code frame. Instead, bits or symbols can be collected into groups that are matched to parameters relevant to the source decoder 220. For example, each of the groups can correspond to a source code frame or a designated portion thereof, such that the error flags can provide more effective use of the error element 224 in the source decoder 220. This advantage of the invention will be described in greater detail below with reference to FIGS. 3(*a*), 3(*b*) and 3(*c*).

In the above-described example implementation of the flag generator 222, an error flag is generated if any one decoded bit or symbol in a designated group of bits or symbols has a value less than the predetermined threshold. To increase the reliability of the error flag, the error flag may instead be conditioned on the reliability measures of only a subset of the bits or symbols in a given group, e.g., the bits or symbols that are the least reliable in the group, or may be based on differences between the most reliable and the least reliable in the group. The threshold can also be adapted dynamically, based on factors such as the current channel condition, the changing error sensitivity of the group of bits or symbols in the error flag frame as determined by the source decoder, and the changing number of bits or symbols corresponding to a particular parameter relevant to the source decoder. Furthermore, if the source decoder has, e.g., a priori knowledge about the group of bits or symbols in the current error flag frame, this information can also be utilized in determining the threshold for generating the error flag. The channel error flag generation of the present invention can thus be implemented dynamically at the receiver. This is in contrast to conventional block error detecting using Reed Solomon (RS) or cyclic redundancy check (CRC) codes where the block length is fixed at the transmitter, with pre-determined error detecting capability. For these conventional techniques, the receiver has to know exactly the block length and the code rate used at the transmitter, thus making such techniques difficult to alter dynamically.

It should be noted that the above-described channel error flag generation does not require the addition of extra redundancy at the source encoder. It can be implemented solely at the source decoder, in the manner shown in FIG. 2, in order to improve source decoder performance. However, as noted previously, this error flag generation can also be used in conjunction with additional system redundancy provided by RS codes, CRC codes, or other types of outer channel codes.

Depending on the block length, the error detection capability provided using the techniques of the illustrative embodiment of the invention as shown in FIG. 2 may not exhibit the same level of reliability as conventional block-based coders. Nonetheless, it provides a level of reliability that is acceptable for many IBOC DAB systems as well as numerous other communication system applications, while also providing the other significant advantages described above, i.e., matching of error flags to source-coded frames or portions thereof, dynamic alteration of the error threshold, and elimination of extra redundancy.

A number of examples will now be described, illustrating in greater detail the use of the above-described channel error flags to provide improved error detection in conjunction with particular types of source coding, i.e., audio and video coding.

FIGS. 3(*a*), 3(*b*) and 3(*c*) illustrate the advantages of the present invention in matching channel error flags to source-coded frames or portions thereof generated by an audio coder which has a variable frame length. An example of an audio coder of this type is the perceptual audio decoder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein. In order to compress a source audio signal efficiently, such an audio coder generates variable numbers of bits for each frame. The number of bits can vary between, e.g., from 500 bits to 3000 bits.

FIG. 3(*a*) shows the conventional relationship between variable-length frames from an audio coder and the outer channel code blocks of a CRC code. As noted previously, error flags based on the CRC code are generated for a fixed block length, such that a mismatch arises between the variable-length audio frames and the fixed-length CRC blocks. The figure shows a number of variable-length source-coded audio frames including frames l, l+1 and l+2, which include 500 bits, 2000 bits and 300 bits, respectively. Also shown are the corresponding fixed-length CRC blocks generated from the variable-length audio frames l, l+1 and l+2. These CRC blocks include blocks i, i+1, i+2, i+3 and i+4.

It can be seen from FIG. 3(*a*) that the CRC blocks are not matched to the variable-length audio frames. As a result, an error flag generated for CRC block i due to an error occurring in bit j can lead to the discarding of at least two consecutive source-coded audio frames l and l+1. This is because the CRC block i overlaps with at least these two audio frames, and the channel decoder cannot determine which of the audio frames contains the error. The error mitigation/concealment algorithm in the source decoder will then have to mitigate or conceal errors for two consecutive audio frames, in this case 2500 bits, which is typically much more challenging than mitigating or concealing errors in one audio frame.

In order to match the conventional channel code block length to the audio frame length, extra control information generally has to be communicated reliably from the encoder to the decoder, and this information has to be available at the receiver before channel decoding. Furthermore, the error detection capability of a given block code, such as an RS or CRC code, varies depending on the block length, for a fixed amount of redundancy. Thus, source-coded audio frames of different lengths can be given error flags of varying error detection capabilities if the code rate applied to each audio frame by the channel encoder is fixed. Otherwise, different rate channel coders have to be applied to audio frames of different lengths, and since the audio frame length changes from frame to frame, the amount of extra control information to be transmitted and the decoder complexity can increase significantly.

The flag generation process of the illustrative embodiment of the invention avoids the above-described mismatch-related problems of the conventional block coding of FIG. 3(a). More particularly, the invention in the illustrative embodiment allows channel error flags to be generated based on reliability measures corresponding to bits in a source-coded audio frame rather than in a channel code frame, such that a given flag can correspond each source-coded audio frame regardless of the number of bits in that frame and without requiring transmission of additional control information.

FIG. 3(b) illustrates the one-to-one correspondence that may be provided between the source-coded audio frames l, l+1 and l+2 and channel error flags generated by the flag generator 222 of FIG. 2. The vertical lines denoting the error flag frame boundaries in FIG. 3(b) correspond to the vertical lines in FIG. 3(a) which denote the source-coded audio frame boundaries. Advantageously, the channel error flags can be generated in this manner regardless of the particular length of the source-coded audio frames, and can be determined dynamically at the source decoder without requiring that extra control information be sent from the transmitter. If the same threshold is used to generate each of the flags, all of the source-coded audio frames will be subject to the same error detection capability. However, the invention also allows one to generate multiple error flags for subframes of a given variable-length source-coded audio frame, so as to provide varying error detection capabilities that are matched to the different error sensitivities of the bits in the given source-coded audio frame.

FIG. 3(c) illustrates the manner in which error flags can be provided for subframes of the source-coded audio frames l, l+1 and l+2 using the techniques of the invention. Again, the vertical lines denote the error flag frame boundaries. The solid line boundaries correspond to the source-coded audio frame boundaries of FIG. 3(a), while the dashed line boundaries denote error flag frame boundaries within a given source-coded audio frame. Such an arrangement provides error detecting capability which can be better matched to the source-coded audio bits, and thus improves the performance of the error mitigation/concealment element 224. In the figure, it can be seen that two error flags are generated for source-coded audio frame l, five error flags are generated for frame l+1, and three error flags are generated for frame l+2.

A more detailed example of the application of the error flag matching of FIG. 3(a) will now be described with reference to an audio encoder which uses variable-length codes such as Huffman codes or arithmetic codes. One common property of such codes is that even a single undetected bit error can cause the source decoder to lose synchronization. As a result, the source decoder may decode to an incorrect sequence and decoded signal quality may be severely degraded. Thus, it is advantageous to use error flags to indicate to the source decoder if bit errors are contained in the decoded frame after the channel decoder so that the source decoder can stop decoding when a bit error occurs. On the other hand, correctly decoded bits from the variable length decoder before a bit error occurs are often useful for the source decoder. Thus, it is useful for the source decoder to generate multiple error flags corresponding to different groups or subframes of bits in a given source-coded frame, so that source decoding can stop only when an error flag occurs. In accordance with the invention, the number of error flags required per frame can be dynamically determined at the source decoder and different sets of thresholds can be used to generate the flags, depending on the error sensitivities of the corresponding group of bits.

Figure 4:
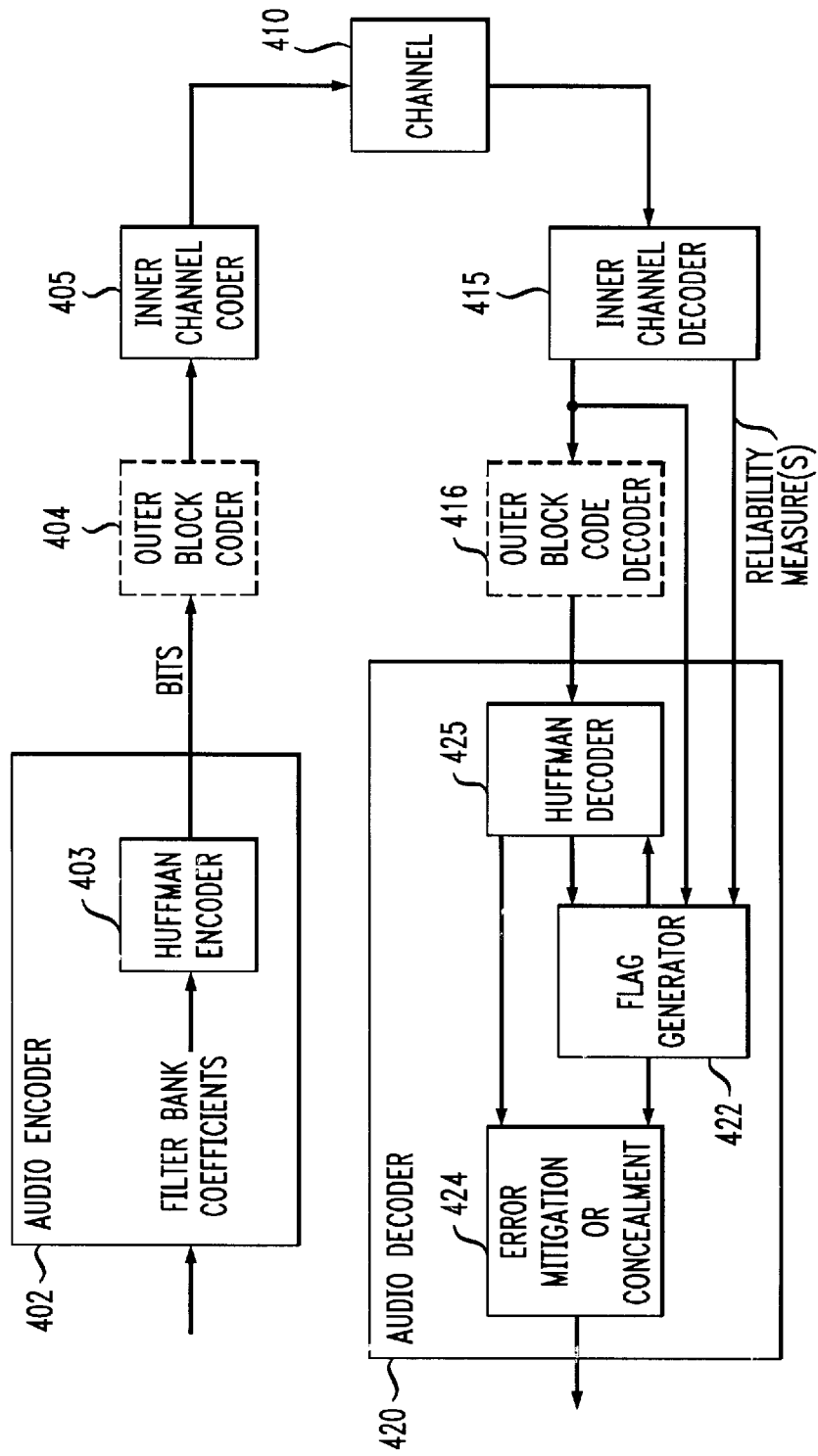
FIG. 4 shows a block diagram of an implementation of the FIG. 2 system suitable for use in an audio coding application.

FIG. 4 shows an example of a communication system 400 in which the above-described subframe error flag generation may be implemented. A transmitter portion of the system 400 includes an audio encoder 402 and an inner channel coder 405. The audio encoder 402 includes a Huffman encoder 403. An outer block coder 404 and corresponding outer block code decoder 416 are shown in dashed outline since the present invention allows these elements to be eliminated. A receiver portion of the system 400 includes an inner channel decoder 415 and an audio decoder 420. The audio decoder 420 includes a flag generator 422, an error mitigation/concealment element 424, and a Huffman decoder 425.

The audio encoder 402 is assumed without limitation to be a PAC encoder as described in the above-cited D. Sinha et al. reference. In such an encoder, a set of 1024 filterbank coefficients generated for a given audio frame are divided into different coding bands before the appropriate Huffman table is applied in the Huffman encoder 403 to encode the coefficients in each band. The output of the Huffman encoder 403 is a sequence of source-coded audio bits that are transmitted through channel 410 of the system 400. The Huffman encoder 403 is a variable-length coder, such that the number of output bits will vary depending on the value of the coefficients and their likelihood of occurrence. The PAC encoder 402 also transmits as control information the number of coefficients in each coding band and the Huffman code table number used to encode the coefficients in each coding band. At the decoder 420, the appropriate Huffman table for the first coding band is used to decode the received bit stream in Huffman decoder 425, until the expected number of coefficients is received for the first coding band. The appropriate Huffman table for the second coding band is then applied until the expected number of decoded coefficients for the second coding band is decoded. This process is repeated until all the appropriate Huffman tables are used for all the coding bands.

In a conventional implementation of the audio decoder 420, if the total number of coefficients after decoding all the coding bands is not 1024, a decoding error is detected and the entire frame of source-coded audio data corresponding to the 1024 transmitted coefficients is discarded. The present invention avoids this problem by allowing error flags to be generated for designated subframes of a given source-coded audio frame. More particularly, error flags corresponding to each coding band can be computed so that the particular coding band that contains an error can be identified. This cannot be done using conventional outer block codes such as RS or CRC codes because the outer block code decoder 416 does not know how many transmitted bits are contained in each coding band until after the Huffman decoding is completed, but the outer block code decoding is done before the Huffman decoding.

Since Huffman codes are variable length codes and even though the number of coefficients corresponding to each coding band is known at the source decoder, the number of bits in each coding band is not known until completion of Huffman decoding when using the above-described conventional implementation. Thus, only the decoded filterbank coefficients from the coding bands before the band with a detected error can be preserved and used in the error mitigation/concealment algorithm. Once an error occurs in one of the bands of a given source-coded audio frame, decoding cannot be done on subsequent bands of the frame, even thought a different Huffman table is used for each band, because the source decoder does not know which bits to start decoding for the following bands.

Figure 5A:
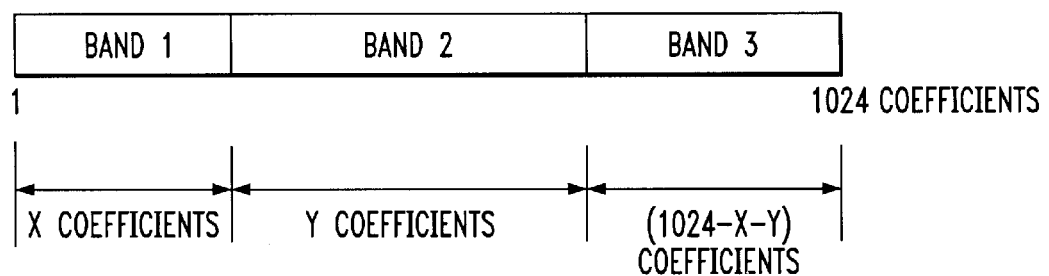
FIGS. 5(a) and 5(b) illustrate channel flag generation in the FIG. 4 system using the techniques of the present invention.

FIG. 5(a) illustrates this situation using an example in which a set of 1024 filterbank coefficients are divided into three coding bands denoted Band 1, Band 2 and Band 3. If an error is detected in Band 2, the decoded X coefficients from Band 1 can be used. However, due to the error in Band 2, the particular number of bits corresponding to the Y decoded coefficients from Band 2 is unreliable. Since the source decoder does not have information on the number of bits corresponding to each band, it is unable to determine which bit to start decoding for Band 3.

In accordance with another aspect of the present invention, the situation illustrated in FIG. 5(a) can be avoided by transmitting from the audio encoder 402 the particular number of bits used for each of the coding bands in a given source-coded audio frame.

Figure 5B:
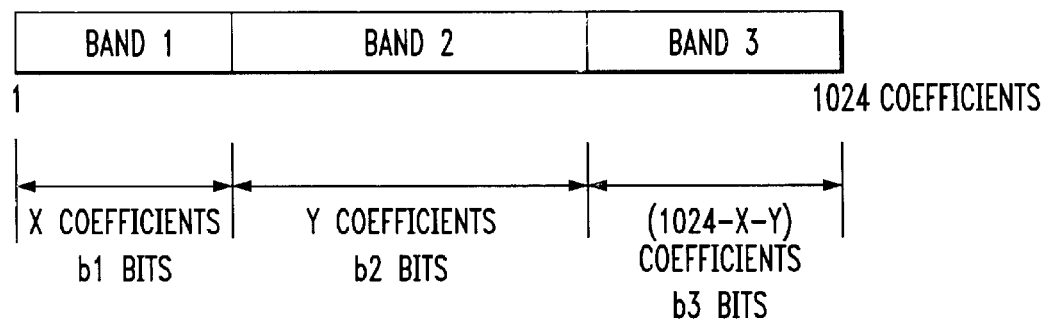

FIG. 5(b) shows that the particular numbers of bits associated with the coding bands Band 1, Band 2 and Band 3 are given by b1, b2 and b3, respectively. The particular number of bits for each of the coding bands may be transmitted as additional control information within the source-coded audio frame and is thereby made available to the source decoder 420. This makes the boundaries of each band explicit so that the bits in each band can be Huffman decoded separately, and eliminates error propagation from one band to another. As a result, error flags can be generated for each coding band using the techniques of the invention, and decoding errors that occur in each band can be isolated as is illustrated in FIG. 5(b). More particularly, if a bit error has occurred in Band 2, only the decoded coefficients from Band 2 need to be discarded. The source decoder can then start decoding from bit position (b1+b2) for Band 3.

The filterbank coefficients corresponding to the lower frequencies are typically more important in a PAC audio encoder, compared to coefficients corresponding to higher frequencies. Thus, the coding bands that contain lower frequency filter bank coefficients may require an error flag with higher error detecting capability, e.g., a higher reliability threshold, even though a higher false alarm rate may occur. For example, if Band 1 in FIG. 5(b) contains the lower frequency coefficients and Band 3 contains the higher frequency coefficients, the error detection capability for Band 1 should be made higher than that of Band 3.

In typical PAC encoders, the number of bands and the number of coefficient in each band changes from frame to frame dynamically. Thus, by generating error flags based on groups of decoded bit reliability measures using the techniques of the invention, error flags of variable length and detection capability can be adapted dynamically at the audio decoder.

The audio coding example described above in conjunction with FIGS. 3, 4 and 5 illustrates that the error flag generation techniques of the present invention can not only match error flag frame length to different parameters in a source-coded bit stream but can also dynamically adapt error flag frame length and detection capability when the number of bits corresponding to each parameter changes dynamically.

As previously noted, the techniques of the present invention can be applied to a wide variety of different source signals. Examples relating to speech, image and video coding will now be described in greater detail.

In a conventional Global System for Mobile communication (GSM) speech coder, coded bits corresponding to different filter coefficients and quantizer outputs are classified into different classes of bits including Class 1a, Class 1b and Class 2 bits. Class 1a bits are protected using both an outer CRC code and a inner convolutional code. Class 1b bits are protected using only the inner convolutional code. Class 2 bits are transmitted without channel error protection. The number of bits that are to be included in Class 1a is partly determined by the error sensitivity of bits in the bit stream. For example, if too many bits are included in Class 1a, an error occurring in one Class 1a bit may result in erasure of a complete source-coded frame even though this bit error may not cause significant audible degradation of decoded speech quality. On the other hand, if too few bits are included in Class 1a, an undetected error on one bit that is not included in Class 1a, but should have been, may cause significant distortion in decoded speech quality. Additional details regarding conventional coding techniques for GSM speech can be found in, e.g., W. Xu, "Joint Source-Channel Coding with a Redundancy-Matched Binary Mapping in GSM Speech Transmission," IEEE, 1998.

The error flag generation techniques of the present invention can be used in conjunction with or in place of the CRC code to provide a desired decoded speech quality. More particularly, a strong outer CRC code may be used to protect the most sensitive bits, i.e., those bits that will cause significant degradation of decoded speech quality if an error occurs. Even though no outer CRC code is used for the Class 1b bits, the error flag generation techniques of the invention can be used to detect errors in the Class 1b bits, so as to reduce the adverse effect of undetected Class 1b bit errors on the decoded speech quality. These techniques can also be used to generate error flags for the Class 2 bits, although the threshold setting used to trigger an error flag for Class 2 bits should be lower than that used for Class 1b bits because the Class 2 bits are less sensitive to errors. The Class 1b and Class 2 bits may be further subdivided to provide error detection capability better matched to the particular source-coded bits, in a manner similar to that previously described for source-coded audio bits in conjunction with FIG. 3(c). Advantageously, the error flag generation techniques of the present invention can be applied in the manner described above through modification of the speech decoder only, and thus without the need for any modification to the transmitter portion of the system. This feature is particularly important for systems that must comply with a specific transmission standard such as GSM.

As previously noted, the present invention can also allow the outer block code to be completely eliminated. Since typical block codes, such as RS and CRC codes, are much more effective when the block length is large, it is inefficient to apply an outer block code to a few bits corresponding to a parameter that is very sensitive to errors, such as the most significant bits corresponding to a linear prediction filter coefficient or a quantized gain parameter in the above speech coding example. Using the techniques of the invention, an error flag can be generated for a small number of bits that correspond to a particular parameter or set of parameters in a speech coder so as to improve error mitigation/concealment in the speech decoder.

Image and video coding applications can also utilize the flag generation techniques of the invention to provide improved error mitigation/concealment. For example, source-coded video generated in accordance with standards such as H.263 or MPEG-4 can be source decoded using the flag generation techniques of the invention to detect errors for particular sets of bits corresponding to certain parameters, such as motion vectors, that are very sensitive to transmission errors. These techniques can be applied with or without a conventional outer block code. As another example, source-coded images or video generated using a SPIHT coder or other wavelet-based coder can utilize error flags generated at the receiver based on groups of bits in an image or video frame so that once an error flag is raised, decoding may be terminated to avoid propagation of errors. In addition, since bits at the beginning of each image or video frame are generally more error sensitive than bits at the end of each frame, the threshold for triggering the error flags for one or more subframes corresponding to the beginning of an image or video frame may be set lower than the threshold used for one or more subframes corresponding to the end of the image or video frame. Additional details regarding SPIHT coders can be found in, e.g., A. Said et al., "A New and Efficient Image Codec Based on Set Partitioning in Hierarchical Trees," IEEE Transactions on Circuits and Systems for Video Tech., June 1996.

The error flag generation techniques of the invention can be used in conjunction with any desired type of inner channel coding, including convolutional codes, Turbo codes and other concatenated codes, and trellis coded modulation. These channel coding techniques are well known in the art and are therefore not described in detail herein. A significant advantage of the present invention is that it allows reliable error flags matched to source-coded bit stream parameters to be generated when these and other types of conventional inner channel codes are used.

The invention in the illustrative embodiment to be described above provides error flag generation techniques particularly well-suited for use in conjunction with source decoding of source-coded information bits, e.g., compressed audio bits generated by an audio coder such as a PAC encoder, transmitted over a communication channel of an AM or FM IBOC DAB system. It should be emphasized that the error flag generation techniques of the invention may be applied to many other types of source-coded information, e.g., source-coded speech, image or video information. In addition, the invention may be utilized in a wide variety of different types of communication system applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems. These and numerous other alternative embodiments and implementations within the scope of the following claims will be apparent to those skilled in the art.

What is claimed is:

1. A method of generating error flags for use in source decoding of a source-coded bit stream transmitted through a channel of a communication system using at least one channel code, the method comprising the steps of:

decoding the channel code using a soft-decision channel decoder to generate a received version of the source-coded bit stream and one or more reliability measures associated with a portion of the received version of the source-coded bit stream; and processing the reliability measures to generate one or more error flags indicative of the presence of an error in the corresponding portion of the received version of the source-coded bit stream, wherein the error flags are utilized in a source decoder in conjunction with source decoding of the received version of the source-coded bit stream.

2. The method of claim 1 wherein the one or more error flags are utilized to trigger an error mitigation/concealment algorithm in the source decoder.

3. The method of claim 1 wherein at least a subset of the reliability measures generated by the soft-decision channel decoder comprise a posteriori probabilities for each of a plurality of bits or symbols in the portion of the received version of the source-coded bit stream.

4. The method of claim 1 wherein at least a subset of the reliability measures generated by the soft-decision channel decoder comprise log-likelihood ratios for each of a plurality of bits or symbols in the portion of the received version of the source-coded bit stream.

5. The method of claim 1 wherein the soft-decision channel decoder implements a forward-backward decoding algorithm.

6. The method of claim 1 wherein the soft-decision channel decoder comprises a soft-decision Viterbi decoder.

7. The method of claim 1 wherein the reliability measures for each decoded bit or symbol in the portion of the received source-coded bit stream are checked against a threshold, and if any one of the bits or symbols have reliability measures below the threshold, an error flag is generated for the portion.

8. The method of claim 1 wherein the reliability measures for one or more designated least reliable bits or symbols in the portion are compared to the reliability measures for one or more designated most reliable bit or symbols in the portion, and an error flag is generated for the portion based on the comparison.

9. The method of claim 1 wherein an error flag is generated for a first portion of the received version of the source-coded bit stream by checking corresponding reliability measures against a first threshold and an error flag is generated for a second portion of the received version of the source-coded bit stream by checking corresponding reliability measures against a second threshold.

10. The method of claim 1 wherein error flags are generated for different portions of the received version of the source-coded bit stream by checking corresponding reliability measures against thresholds which are dynamically adapted to characteristics of the different portions.

11. The method of claim 1 wherein each of the error flags is matched to a frame of the source-coded bit stream.

12. The method of claim 1 wherein each of the error flags is matched to a subframe of the source-coded bit stream.

13. The method of claim 1 wherein the at least one channel code comprises an inner channel concatenated code.

14. The method of claim 1 wherein the at least one channel code comprises inner channel trellis coded modulation.

15. The method of claim 1 wherein the channel code comprises an inner channel convolutional code.

16. The method of claim 1 wherein the source-coded bit stream comprises at least one of audio, speech, image and video information.

17. An apparatus for use in decoding of a source-coded bit stream transmitted through a channel of a communication system using at least one channel code, the apparatus comprising:

a soft-decision channel decoder for decoding the channel code to generate a received version of the source-coded bit stream and one or more reliability measures associated with a portion of the received version of the source-coded bit stream; and a source decoder having an input coupled to an output of the soft-decision channel decoder and being operative to process the reliability measures to generate one or more error flags indicative of the presence of an error in the corresponding portion of the received version of the source-coded bit stream, wherein the error flags are utilized in the source decoder in conjunction with source decoding of the received version of the source-coded bit stream.

18. An apparatus for use in decoding of a source-coded bit stream transmitted through a channel of a communication system using at least one channel code, the channel code being decoded in a soft-decision channel decoder to generate a received version of the source-coded bit stream and one or more reliability measures associated with a portion of the received version of the source-coded bit stream, the apparatus comprising:

a source decoder operative to process the reliability measures to generate one or more error flags indicative of the presence of an error in the corresponding portion of the received version of the source-coded bit stream, wherein the error flags are utilized in the source decoder in conjunction with source decoding of the received version of the source-coded bit stream.

19. An article of manufacture for storing one or more software programs for use in decoding of a source-coded bit stream transmitted through a channel of a communication system using at least one channel code, the channel code being decoded in a soft-decision channel decoder to generate a received version of the source-coded bit stream and one or more reliability measures associated with a portion of the received version of the source-coded bit stream, wherein the one or more programs when executed implement the step of:

processing the reliability measures to generate one or more error flags indicative of the presence of an error in the corresponding portion of the received version of the source-coded bit stream, wherein the error flags are utilized in a source decoder in conjunction with source decoding of the received version of the source-coded bit stream.

* * * * *